United States Patent
Yamashita et al.

(10) Patent No.: US 7,634,079 B2
(45) Date of Patent: Dec. 15, 2009

(54) TELEPHONE TERMINAL AND METHOD FOR SUPPLYING POWER TO THE SAME

(75) Inventors: Takeshi Yamashita, Tokyo (JP); Takeshi Horiuchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 810 days.

(21) Appl. No.: 11/170,320

(22) Filed: Jun. 30, 2005

(65) Prior Publication Data

US 2006/0003816 A1    Jan. 5, 2006

(30) Foreign Application Priority Data

Jun. 30, 2004    (JP)    ............ P2004-194950

(51) Int. Cl.
*H04M 3/02*    (2006.01)
(52) U.S. Cl. ........... 379/387.01; 307/19; 363/21.11; 370/235; 370/352; 375/258; 379/413; 455/550.1; 455/572
(58) Field of Classification Search ........... 379/355.01, 379/387, 387.01, 413; 455/574, 566, 569.1, 455/572, 573, 550.1; 370/352, 353, 235; 363/21.11; 375/258; 307/19
See application file for complete search history.

(56) References Cited

U.S. PATENT DOCUMENTS

| | | | | |
|---|---|---|---|---|
| 4,852,147 A * | 7/1989 | Suzuki et al. | ............ | 455/574 |
| 5,005,198 A * | 4/1991 | Toda | ............ | 455/573 |
| 5,036,532 A * | 7/1991 | Metroka et al. | ............ | 455/566 |
| 5,289,359 A * | 2/1994 | Ziermann | ............ | 363/21.11 |
| 5,335,263 A * | 8/1994 | Tsunehiro et al. | ............ | 455/572 |
| 5,584,055 A * | 12/1996 | Murui et al. | ............ | 455/569.1 |
| 6,597,688 B2 * | 7/2003 | Narasimhan et al. | ............ | 370/353 |
| 6,697,358 B2 * | 2/2004 | Bernstein | ............ | 370/352 |
| 6,710,704 B2 * | 3/2004 | Fisher et al. | ............ | 375/258 |
| 6,917,681 B2 * | 7/2005 | Robinson et al. | ............ | 379/387.01 |
| 7,003,102 B2 * | 2/2006 | Kiko | ............ | 379/413 |
| 7,053,501 B1 * | 5/2006 | Barrass | ............ | 307/19 |
| 7,120,139 B1 * | 10/2006 | Kung et al. | ............ | 370/352 |
| 7,317,793 B2 * | 1/2008 | Binder et al. | ............ | 379/413 |
| 2003/0185385 A1 * | 10/2003 | Boudreaux et al. | ............ | 379/387.01 |

(Continued)

FOREIGN PATENT DOCUMENTS

JP    04-192698    7/1992

(Continued)

OTHER PUBLICATIONS

Notification of Reasons Refusal dated May 12, 2009 issued by the Japanese Patent Office in JP 2004-194950 (3 pages) with English translation thereof (5 pages).

*Primary Examiner*—Gerald Gauthier
(74) *Attorney, Agent, or Firm*—Finnegan, Henderson, Farabow, Garrett & Dunner, L.L.P.

(57) ABSTRACT

A telephone terminal includes: a main unit; an optional unit that performs an arbitrary additional communication function and detachably attached to the main unit; a distribution unit that distributes a drive power supplied through a communication network into a first channel and a second channel when a power of the telephone terminal is turned on; a first power supplying unit that supplies the first channel of the drive power to the main unit at a first timing; and a second power supplying unit that supplies the second channel of the drive power to the optional unit at a second timing shifted from the first timing.

17 Claims, 6 Drawing Sheets

U.S. PATENT DOCUMENTS

2005/0220021 A1* 10/2005 Sosnowski et al. .......... 370/235
2007/0064918 A1* 3/2007 Son ....................... 379/355.01

FOREIGN PATENT DOCUMENTS

| JP | 04-239898 | 8/1992 |
| JP | 06-054089 | 2/1994 |
| JP | 08-320740 | 12/1996 |
| JP | 11-075228 | 3/1999 |
| JP | 2004-048888 | 2/2004 |

* cited by examiner

FIG. 8

TELEPHONE TERMINAL AND METHOD FOR SUPPLYING POWER TO THE SAME

RELATED APPLICATIONS

The present disclosure relates to the subject matter contained in Japanese Patent Application No. 2004-194950 filed on Jun. 30, 2004, which is incorporated herein by reference in its entirety.

BACKGROUND OF THE INVENTION

1. Field of the Invention

This invention relates to a telephone terminal of a network telephone system for conducting voice communications between telephone terminals through an IP network, such as an IP (Internet Protocol) telephone system, for example, and a power supply method used with the telephone terminal.

2. Description of the Related Art

In recent years, a network telephone system (IP telephone system) for transmitting and receiving an image and voice as packet data bi-directionally in real time through a packet network has begun to become widespread.

In the IP telephone system, inter-extension communications can be conducted and outside line outgoing and incoming calls can be made for each gateway connected to the packet network, of course, and in addition, extension communications can be conducted and outside line outgoing and incoming calls can be made between the gateway via the packet network. In this case, communications can be carried out as power (drive power) is supplied to an IP telephone terminal in accordance with a power supply technique such as POE (Power Over Ethernet), which is described in below.

Power supply is received through the packet network from the gateway.

Power supply is received from a network component of a router, a switching hub, etc., forming a part of a LAN.

Power supply is received from a midspan unit. The midspan unit is a power supply dedicated unit being installed between a "network component with no power supply function" and a "terminal to which power is to be supplied" for allowing a LAN signal to pass through and adding only supply power.

In the IP telephone system, to purchase an IP telephone terminal for use, the user generally selects an IP telephone terminal having necessary functions at the point in time. However, after use of the IP telephone terminal is started, it becomes necessary to add a function in response to change in the use situation, etc. In such a case, a technique for the user of the IP telephone terminal to connect an optional unit for executing any desired function to the IP telephone terminal main unit is proposed. (For example, refer to JP-A-4-192698 and JP-A-4-239898.)

SUMMARY OF THE INVENTION

However, in the POE technique mentioned above, there is a limit on rush current at the power on time. Thus, if the rush current is too large, there is a possibility that power supply from the gateway will not be received. Particularly, if an optional unit is connected to the IP telephone terminal, the rush current at the power on time, of the optional unit as well as the IP telephone terminal main unit is added. Thus, if the total rush current is too large and is placed out of the POE standard, it becomes impossible to receive power supply.

The present invention provides a telephone terminal of a network telephone system and a power supply method used with the telephone terminal for making it possible to place rush current at the power on time within a stipulated value and moreover reduce the cost when a plurality of optional units are connected.

According to a first aspect of the invention, there is provided a telephone terminal connected via a communication network for transmitting a communication packet to a gateway to which a plurality of the telephone terminals are to be connected and supplies drive power to the telephone terminals required for communication operation through the communication network. The telephone terminal includes: a main unit; an optional unit that performs an arbitrary additional communication function and detachably attached to the main unit; a distribution unit that distributes the drive power supplied through the communication network into a first channel and a second channel when a power of the telephone terminal is turned on; a first power supplying unit that supplies the first channel of the drive power to the main unit at a first timing; and a second power supplying unit that supplies the second channel of the drive power to the optional unit at a second timing shifted from the first timing.

According to a second aspect of the invention, there is provided a method for supplying a drive power to a telephone terminal connected via a communication network for transmitting a communication packet to a gateway to which a plurality of the telephone terminals are to be connected and supplies drive power to the telephone terminals required for communication operation through the communication network. The method includes: distributing the drive power supplied through the communication network into a first channel and a second channel when a power of the telephone terminal is turned on; supplying the first channel of the drive power to a main unit of the telephone terminal at a first timing; and supplying the second channel of the drive power to an optional unit of the telephone terminal at a second timing different from the first timing, the optional unit performing an arbitrary additional communication function and detachably attached to the main unit.

According to a third aspect of the invention, there is provided a telephone terminal connected via a communication network for transmitting a communication packet to a gateway to which a plurality of the telephone terminals are to be connected and supplies drive power to the telephone terminals required for communication operation through the communication network. The telephone terminal includes: a main unit; an optional unit that performs an arbitrary additional communication function and detachably attached to the main unit; a distribution means for distributing the drive power supplied through the communication network into a first channel and a second channel when a power of the telephone terminal is turned on; a first power supplying means for supplying the first channel of the drive power to the main unit at a first timing; and a second power supplying means for supplying the second channel of the drive power to the optional unit at a second timing shifted from the first timing.

BRIEF DESCRIPTION OF THE DRAWINGS

In the accompanying drawings.

DETAILED DESCRIPTION OF THE EMBODIMENTS

Hereinafter, embodiments of the invention will be described by reference to the drawings in detail.

First Embodiment

Figure 1:
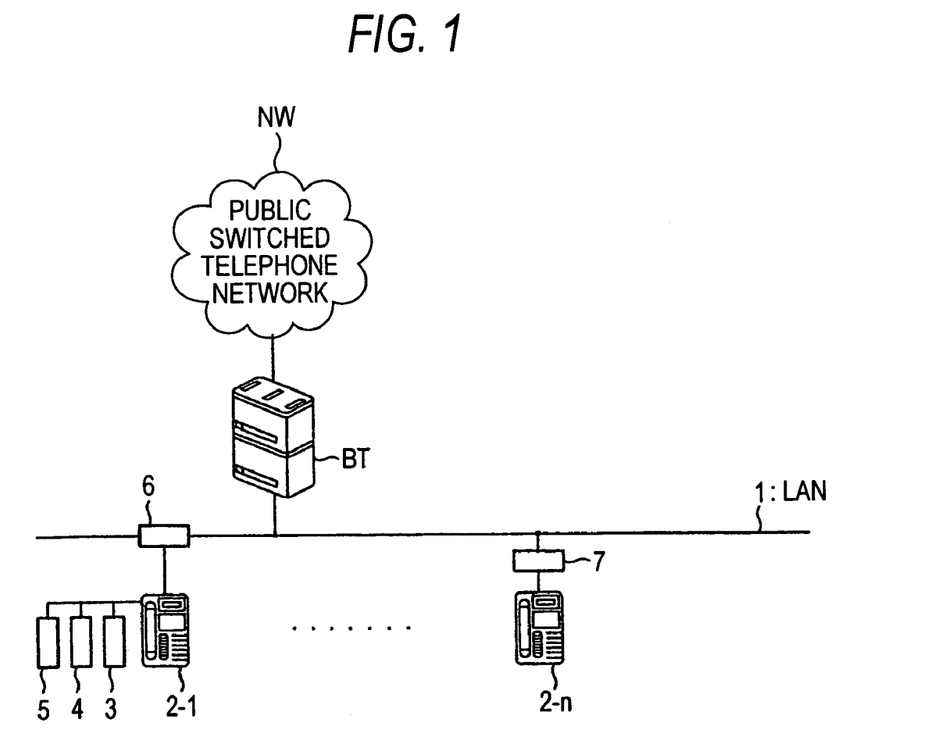
FIG. 1 is a drawing to show the schematic configuration of a network telephone system according to a first embodiment of the invention.

FIG. 1 is a drawing to show the schematic configuration of a network telephone system according to a first embodiment of the invention.

The network telephone system includes a LAN 1. A plurality of IP telephone terminals 2-1 to 2-n (where n is a natural number) are connected to the LAN 1. A gateway (telephone switching equipment) BT is also connected to the LAN 1. The gateway BT connects the IP telephone terminals 2-1 to 2-n connected to the LAN 1 and connects the LAN 1 and a public switched telephone network NW and has a conversion function of communication protocol and signal format between the LAN 1 and the public switched telephone network NW. Further, the gateway BT supplies drive power to the IP telephone terminals 2-1 to 2-n at the starting time. Drive power may be supplied to the IP telephone terminals 2-1 to 2-n from a switching hub 6 and a router 7 installed in the LAN 1.

Optional units 3 to 5 to execute any desired additional function are connected to the IP telephone terminal 2-1.

Figure 2:
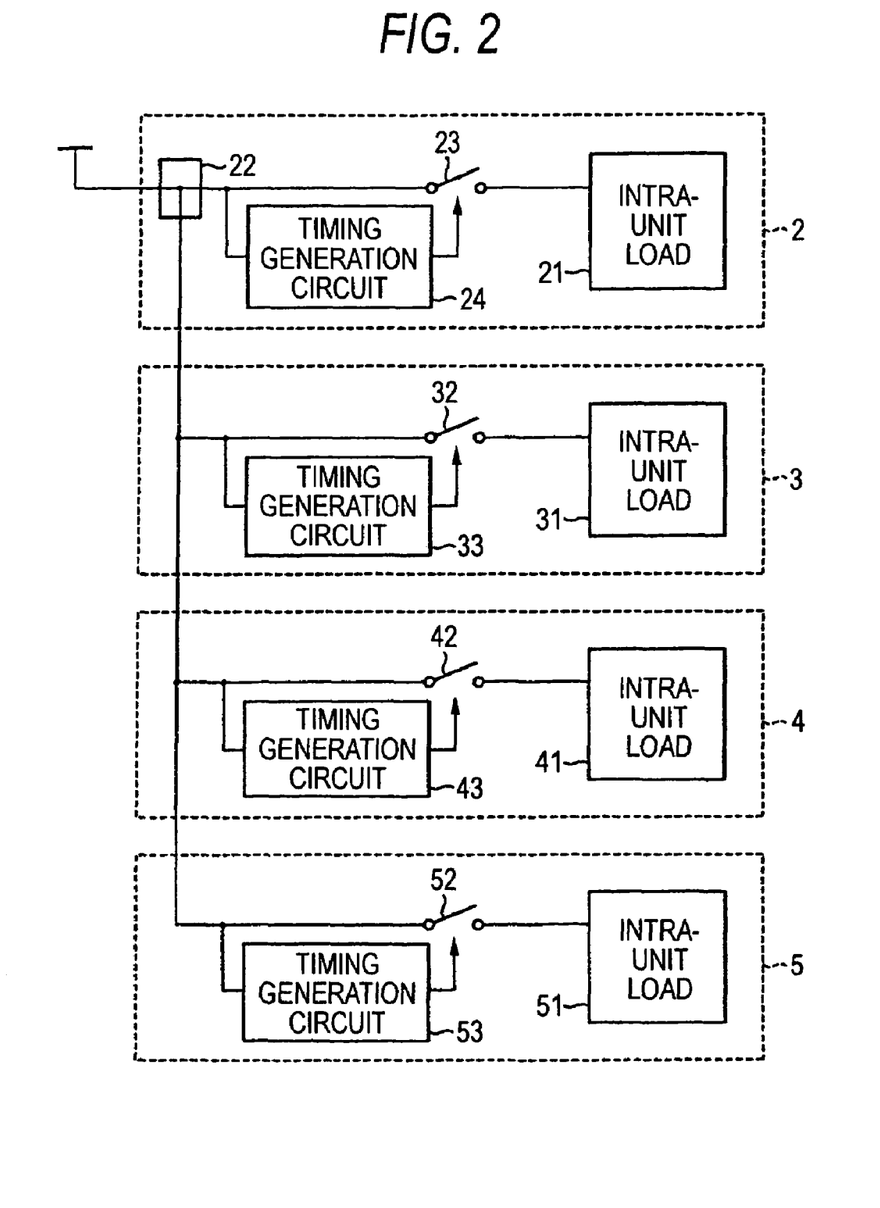
FIG. 2 is a block diagram to show the connection relationship between an IP telephone terminal and optional units in the first embodiment.

FIG. 2 is a block diagram to show the connection relationship between the IP telephone terminal 2-1 and the optional units 3 to 5. In the figure, numeral 21 denotes an intra-unit load circuit for controlling the sections of the IP telephone terminal 2-1 and performing communication processing with the gateway BT through the LAN 1.

In the figure, numerals 31, 41, and 51 denote intra-unit load circuits of the optional units 3, 4, and 5 for controlling the sections of the optional units 3, 4, and 5 and performing communication processing with the gateway BT through the LAN 1 as drive power is fed from the gateway BT.

At the power on time (the time when the IP telephone terminal 2-n is turned on), the drive power fed from the gateway BT through the LAN 1 is distributed to an IP telephone terminal main unit 2 and the optional units 3 to 5 through a power distributor 22. In the IP telephone terminal main unit 2, the distributed drive power is selectively supplied to the intra-unit load circuit 21 by a switch 23. On/off control of the switch 23 is performed by a timing generation circuit 24.

On the other hand, in the optional unit 3, the distributed drive power is selectively supplied to the intra-unit load circuit 31 by a switch 32. On/off control of the switch 32 is performed at a switch timing different from the timing generation circuit 24 by a timing generation circuit 33.

In the optional unit 4, the distributed drive power is selectively supplied to the intra-unit load circuit 41 by a switch 42. On/off control of the switch 42 is performed at a switch timing different from the timing generation circuit 24 by a timing generation circuit 43.

Further, in the optional unit 5, the distributed drive power is selectively supplied to the intra-unit load circuit 51 by a switch 52. On/off control of the switch 52 is performed at a switch timing different from the timing generation circuit 24 by a timing generation circuit 53.

Figure 3:
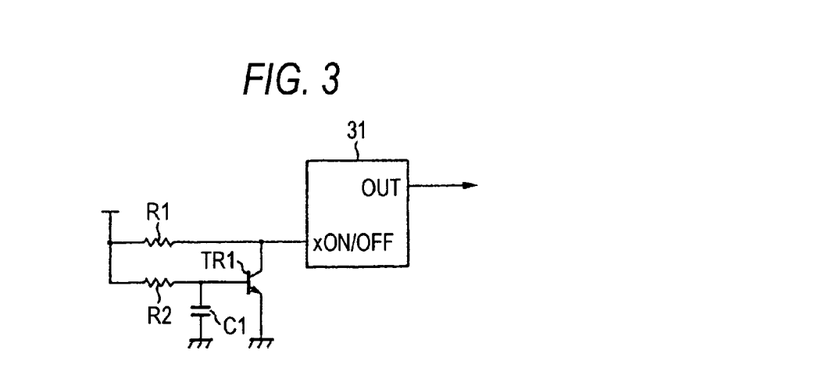
FIG. 3 is a circuit diagram of a switch and a timing generation circuit in the optional unit in the first embodiment.

The switch 32 and the timing generation circuit 33 in the optional unit 3 make up a circuit as shown in FIG. 3.

The switch 32 and the timing generation circuit 33 are made up of resistance elements R1 and R2, a capacitor C1, and a transistor TR1. Output current of the power distributor 22 is supplied through the resistance element R2 to the capacitor C1 and is accumulated in the capacitor C1. The capacitor C1 supplies the accumulated current to the transistor TR1. Then, the transistor TR1 connects the path between the resistance element R1 and the intra-unit load circuit 31, whereby the output current of the power distributor 22 is supplied to the intra-unit load circuit 31. After this, the intra-unit load circuit 31 is started.

Figure 4:
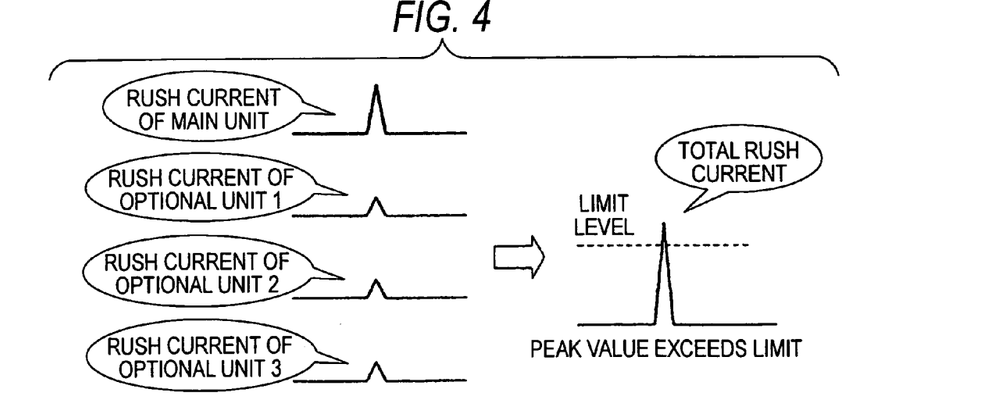
FIG. 4 is a drawing to describe how rush current exceeds a stipulated value.

The operation in the described configuration is as follows:

Assume that the IP telephone terminal main unit 2 and the optional units 3 to 5 are started at the same time, as shown in FIG. 4. Then, rush current becomes the total rush current of the IP telephone terminal main unit 2 and the optional units 3 to 5 and exceeds the limit of the stipulated peak value.

Then, in the embodiment, the power on/off timings are shifted in the timing generation circuits 24, 33, 43, and 53 of the IP telephone terminal main unit 2 and the optional units 3 to 5, thereby shifting the rush current occurrence timing.

In this case, in the IP telephone terminal main unit 2, the time constant (R×C) of the timing generation circuit 24 is made small for early starting and in the optional units 3 to 5, the time constants (R×C) of the timing generation circuits 33, 43, and 53 are made large for late starting.

Figure 5:
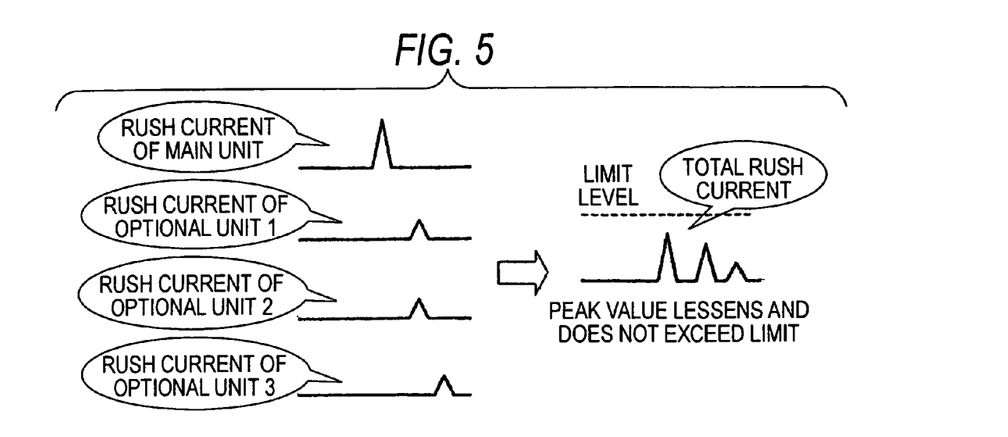
FIG. 5 is a drawing to describe how rush current is placed within a stipulated value in the first embodiment.

Then, the rush current occurs at different timings in the IP telephone terminal main unit 2 and the optional units 3 to 5 and does not exceed the stipulated peak value, as shown in FIG. 5.

As described above, in the first embodiment, the IP telephone terminal main unit 2 and the optional units 3 to 5 are provided with the switches 23, 32, 42, and 52 and the timing generation circuits 24, 33, 43, and 53 different in time constant and at the power on time, the supply timings of drive power to the intra-unit load circuits 21, 31, 41, and 51 are shifted (or made different) among the IP telephone terminal main unit 2 and the optional units 3 to 5, so that the total rush current does not exceed the value stipulated in POE.

Therefore, it is not necessary to provide a new signal line of a control signal required for controlling start of each of the optional units 3 to 5, so that the number of pins for connecting the optional units 3 to 5 can be decreased, resulting in a decrease in the cost.

In the first embodiment described above, the switch 23, 32, 42, 52 and the timing generation circuit 24, 33, 43, 53 can be formed simply by using a transistor and an RC circuit, so that the configurations of the IP telephone terminal main unit 2 and the optional units 3 to 5 can be simplified and miniaturized.

Second Embodiment

Figure 6:
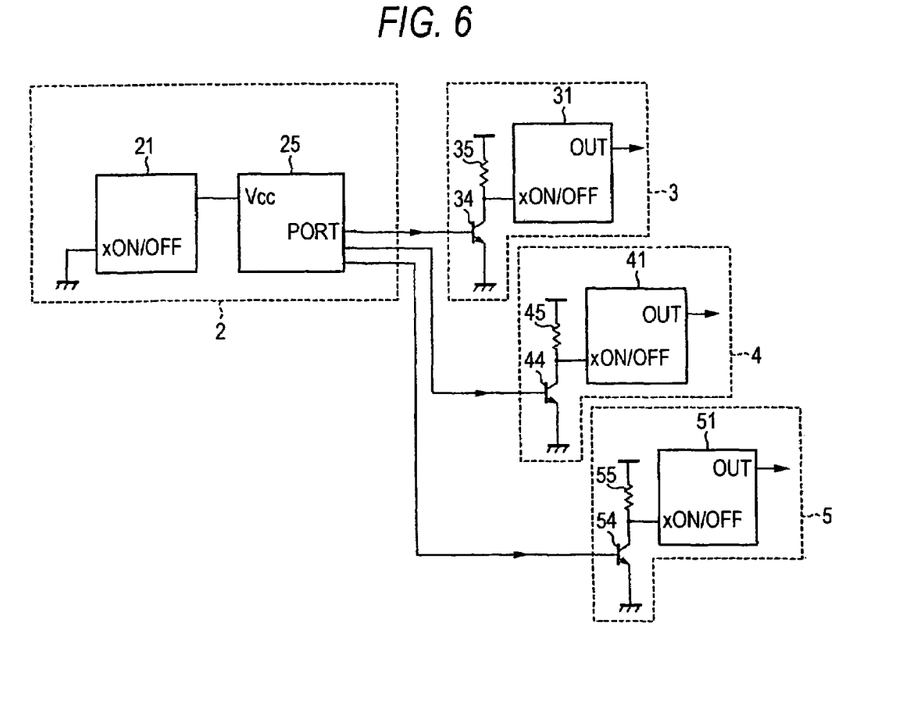
FIG. 6 is a block diagram to show the connection relationship between an IP telephone terminal and optional units according to a second embodiment of the invention.

FIG. 6 is a block diagram to show the connection relationship between an IP telephone terminal 2-1 and optional units 3 to 5 according to a second embodiment of the invention. Parts identical with those previously described with reference to FIG. 2 are denoted by the same reference numerals in FIG. 6 and will not be discussed again in detail.

That is, an IP telephone terminal main unit 2 is provided with a timing generation circuit 25 shared with the optional units 3 to 5. The timing generation circuit 25 outputs output current supplied to intra-unit load circuits 21, 31, 41, and 51 at different timings.

The optional unit 3 is provided with a transistor 34 and a resistance element 35. When the output current is supplied from the timing generation circuit 25, the transistor 34 supplies drive power to the intra-unit load circuit 31 through the resistance element 35.

The optional unit 4 is provided with a transistor 44 and a resistance element 45. When the output current is supplied from the timing generation circuit 25, the transistor 44 supplies drive power to the intra-unit load circuit 41 through the resistance element 45.

The optional unit 5 is provided with a transistor 54 and a resistance element 55. When the output current is supplied from the timing generation circuit 25, the transistor 54 supplies drive power to the intra-unit load circuit 51 through the resistance element 55.

As described above, in the second embodiment, the timing generation circuit 25 installed in the IP telephone terminal main unit 2 is shared by the IP telephone terminal main unit 2 and the optional units 3 to 5 for supplying the drive power to the optional units 3 to 5 collectively.

Since the optional units 3 to 5 are provided with no timing generation circuit, the configuration is simplified and further it is made possible to decrease the number of parts for miniaturizing the unit and reducing the cost.

In the second embodiment, for example, when the optional unit 4 fails, it needs only to be replaced with a new optional unit. Further, in the second embodiment, if a connection connector of the timing generation circuit 25 has an unassigned pin, a new additional optional unit can be easily connected.

Third Embodiment

Figure 7:
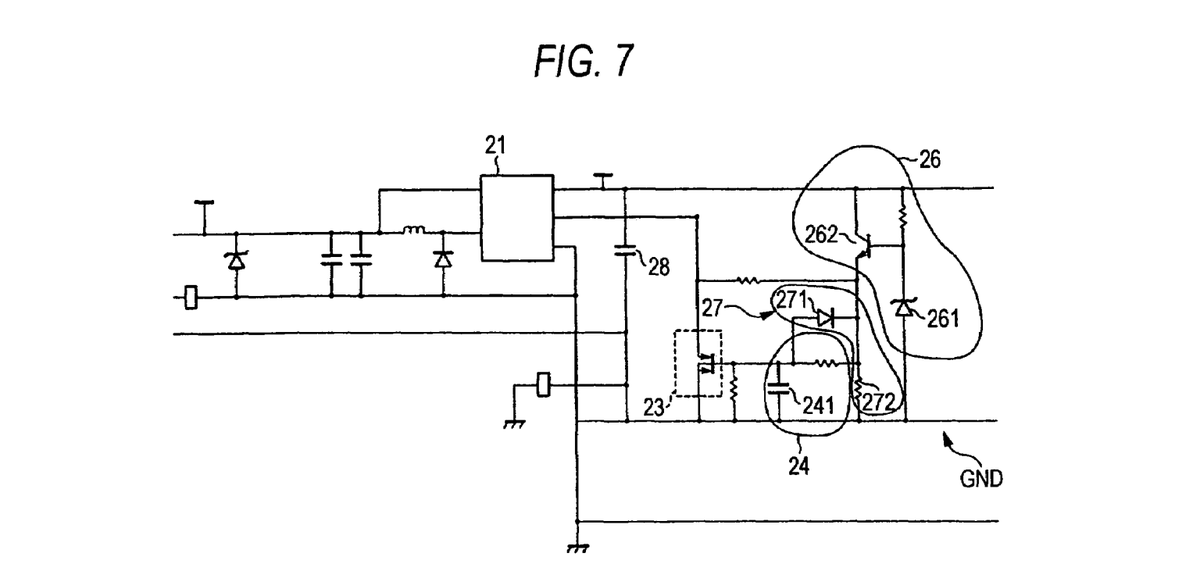
FIG. 7 is a circuit diagram of an IP telephone terminal main unit according to a third embodiment of the invention.

FIG. 7 is a circuit diagram of an IP telephone terminal main unit 2 according to a third embodiment of the invention. Parts identical with those previously described with reference to FIG. 2 are denoted by the same reference numerals in FIG. 7 and will not be discussed again in detail.

A voltage correction circuit 26 is provided at the preceding stage of a timing generation circuit 24. The voltage correction circuit 26 includes a Zener diode 261 and a transistor 262. When power is turned on, the Zener diode 261 turns on the transistor 262. Accordingly, if power supply voltage fluctuates, the power supply start voltage to the timing generation circuit 24 can be stabilized.

The timing generation circuit 24 is provided with a timing generation control circuit 27. The timing generation control circuit 27 includes a diode 271 and a resistance element 272. The diode 271 releases charges of a capacitor 241 installed in the timing generation circuit 24 when an instantaneous power interruption occurs. Accordingly, when the power supply voltage is recovered to the normal voltage, the same start time as the usual start can be provided.

An electrolytic capacitor 28 is connected to an intra-unit load circuit 21, thereby stabilizing the power supply.

Figure 8:
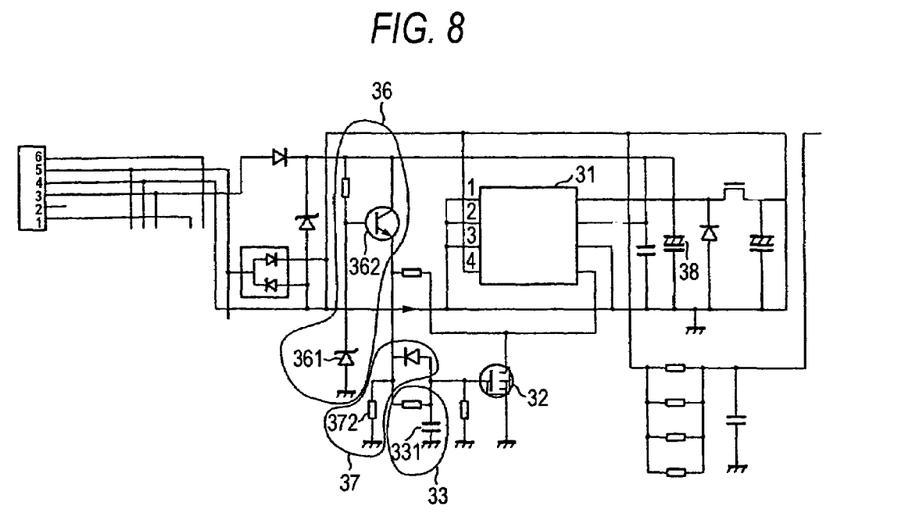
FIG. 8 is a circuit diagram of an optional unit according to the third embodiment.

FIG. 8 is a circuit diagram of an optional unit 3 to 5 according to the third embodiment of the invention. Parts identical with those previously described with reference to FIG. 2 are denoted by the same reference numerals in FIG. 8 and will not be discussed again in detail. Here, the optional unit 3 will be discussed as a representative.

A voltage correction circuit 66 is provided at the preceding stage of a timing generation circuit 33. The voltage correction circuit 36 includes a Zener diode 361 and a transistor 362. When power is turned on, the Zener diode 361 turns on the transistor 362. Accordingly, if power supply voltage fluctuates, the power supply start voltage to the timing generation circuit 33 can be stabilized.

The timing generation circuit 33 is provided with a timing generation control circuit 37. The timing generation control circuit 37 includes a diode 371 and a capacitative element 372. The diode 371 releases charges of a capacitor 331 installed in the timing generation circuit 33 when an instantaneous power interruption occurs. Accordingly, when the power supply voltage is recovered to the normal voltage, the same start time as the usual start can be provided.

Further, an electrolytic capacitor 38 is connected to an intra-unit load circuit 31, thereby stabilizing the power supply.

As described above, in the third embodiment, the IP telephone terminal main unit 2 and the optional unit 3 are provided with the voltage correction circuits 26 and 36 respectively for automatically correcting fluctuation of the voltage supplied to the timing generation circuits 24 and 33, so that if power supply voltage fluctuates, the start time can be stabilized.

In the third embodiment, the IP telephone terminal main unit 2 and the optional unit 3 are provided with the timing generation control circuits 27 and 37 respectively, so that if the power to be supplied to the IP telephone terminal main unit 2 and the optional unit 3 drops instantaneously, drive power can be rapidly supplied when the power supply is recovered.

Miscellaneous Embodiments

The invention is not limited to the specific embodiments described above.

In the description of the embodiments, the drive power supply timing is shifted for each of the IP telephone terminal main unit and the optional units by way of example, but the invention is not limited to the mode. For example, the IP telephone terminal main unit may be divided into a plurality of units and drive power may be supplied to the plurality of units at different supply timings. In doing so, if the rush current fed into the IP telephone terminal main unit exceeds the stipulated value, the rush current can be decreased because the drive power is supplied to the plurality of units at different supply timings. A similar description also applies to the optional unit.

In the description of the embodiments, the IP telephone terminal is taken as an example, but a base station of a radio LAN or a personal computer or a server having a telephone function, for example, may be adopted.

It is to be understood that various modifications and changes of the system configuration and type, the configuration of the IP telephone terminal, the optional unit configuration and type, the circuit configuration of the timing generation circuit, etc., may be made without departing from the spirit and the scope of the invention.

As described above in detail, according to the embodiments, at the power on time, the drive power supply timing is shifted between the telephone terminal main unit and the optional unit, so that the total rush current does not exceed the value stipulated in POE. Therefore, it is not necessary to provide a new signal line of a control signal required for controlling start of the optional unit, so that the number of pins for connecting the optional unit can be decreased, resulting in a decrease in the cost.

According to the embodiments, the first and second delay circuits can be formed simply by using a transistor and an RC circuit, so that the configuration of the delay circuit can be simplified and miniaturized According to the embodiments, fluctuation of the voltage supplied to the first and second delay circuits is automatically corrected, so that if power supply voltage fluctuates, the start time can be stabilized.

According to the embodiments, when the drive power to be supplied to the telephone terminal main unit and the optional unit drops instantaneously, drive power can be rapidly supplied when the power supply is recovered.

According to the embodiments, when the rush current fed into the telephone terminal main unit exceeds the stipulated value, the telephone terminal main unit is divided into a plurality of units and drive power is supplied to the plurality of units at different supply timings, so that the rush current can be decreased.

According to the embodiments, there is provided the telephone terminal of the network telephone system and the power supply method used with the telephone terminal for making it possible to place the rush current at the power on time within the stipulated value and moreover reduce the cost when a plurality of optional units are connected.

What is claimed is:

1. A telephone terminal connected via a communication network for transmitting a communication packet to a gateway to which a plurality of the telephone terminals are to be connected and for supplying drive power to the telephone terminals required for communication operation through the communication network, the telephone terminal comprising:
    a main unit;
    an optional unit that performs an arbitrary additional communication function and detachably attached to the main unit;
    a distribution unit that distributes the drive power supplied through the communication network into a first channel and a second channel when a power of the telephone terminal is turned on;
    a first power supplying unit that supplies the first channel of the drive power to the main unit at a first timing; and
    a second power supplying unit that supplies the second channel of the drive power to the optional unit at a second timing shifted from the first timing.

2. The telephone terminal according to claim 1, wherein the first power supplying unit includes a first delay circuit that delays the first channel of the drive power in a first delay amount in supplying the first channel of the drive power to the main unit, and
    wherein the second power supplying unit includes a second delay circuit that delays the second channel of the drive power in a second delay amount that is different from the first delay amount in supplying the second channel of the drive power to the optional unit.

3. The telephone terminal according to claim 2, wherein the first delay circuit includes:
    a first resistance element that divides a first DC voltage for supplying to the main unit;
    a first switching element that selectively supplying the first DC voltage to the main unit; and
    a first switch control circuit that has a first accumulation capacity to accumulate a first signal current and supplies the first signal current to the first switching element for setting the first switching element to an ON state, and wherein the second delay circuit includes:
    a second resistance element that divides a second DC voltage for supplying to the optional unit;
    a second switching element that selectively supplying the second DC voltage to the optional unit; and
    a second switch control circuit that has a second accumulation capacity to accumulate a second signal current, the second accumulation capacity being different from the first accumulation capacity, and supplies the second accumulation capacity to the second switching element for setting the second switching element to an ON state.

4. The telephone terminal according to claim 2 further comprising:
    a first voltage correction unit that corrects fluctuation of the voltage to be supplied to the first delay circuit; and
    a second voltage correction unit that corrects fluctuation of the voltage to be supplied to the second delay circuit.

5. The telephone terminal according to claim 1 further comprising:
    a first control unit that shortens the time for turning off supply of the first channel of the drive power to the main unit; and
    a second control unit that shortens the time for turning off supply of the second channel of the drive power to the optional unit.

6. The telephone terminal according to claim 1 further comprising a plurality of the optional units,
    wherein the second power supplying unit supplies the second channel of the drive power to each of the optional units at different supply timings.

7. The telephone terminal according to claim 1, wherein the first power supplying unit supplies the first channel of the drive power to a plurality of sections divided in the main unit at different supply timings.

8. The telephone terminal according to claim 1, wherein the second power supplying unit supplies the second channel of the drive power to a plurality of sections divided in the optional unit at different supply timings.

9. A method for supplying a drive power to a telephone terminal connected via a communication network for transmitting a communication packet to a gateway to which a plurality of the telephone terminals are to be connected and for supplying drive power to the telephone terminals required for communication operation through the communication network, the method comprising:
    distributing the drive power supplied through the communication network into a first channel and a second channel when a power of the telephone terminal is turned on;
    supplying the first channel of the drive power to a main unit of the telephone terminal at a first timing; and
    supplying the second channel of the drive power to an optional unit of the telephone terminal at a second timing different from the first timing, the optional unit performing an arbitrary additional communication function and detachably attached to the main unit.

10. A telephone terminal connected via a communication network for transmitting a communication packet to a gateway to which a plurality of the telephone terminals are to be connected and for supplying drive power to the telephone terminals required for communication operation through the communication network, the telephone terminal comprising:
    a main unit;
    an optional unit that performs an arbitrary additional communication function and detachably attached to the main unit;
    a distribution means for distributing the drive power supplied through the communication network into a first channel and a second channel when a power of the telephone terminal is turned on;

a first power supplying means for supplying the first channel of the drive power to the main unit at a first timing; and a second power supplying means for supplying the second channel of the drive power to the optional unit at a second timing shifted from the first timing.

11. The telephone terminal according to claim 10, wherein the first power supplying means includes a first delay circuit that delays the first channel of the drive power in a first delay amount in supplying the first channel of the drive power to the main unit, and wherein the second power supplying means includes a second delay circuit that delays the second channel of the drive power in a second delay amount that is different from the first delay amount in supplying the second channel of the drive power to the optional unit.

12. The telephone terminal according to claim 11, wherein the first delay circuit includes:

a first resistance element that divides a first DC voltage for supplying to the main unit;

a first switching element that selectively supplying the first DC voltage to the main unit; and a first switch control circuit that has a first accumulation capacity to accumulate a first signal current and supplies the first signal current to the first switching element for setting the first switching element to an ON state, and wherein the second delay circuit includes:

a second resistance element that divides a second DC voltage for supplying to the optional unit;

a second switching element that selectively supplying the second DC voltage to the optional unit; and a second switch control circuit that has a second accumulation capacity to accumulate a second signal current, the second accumulation capacity being different from the first accumulation capacity, and supplies the second accumulation capacity to the second switching element for setting the second switching element to an ON state.

13. The telephone terminal according to claim 11 further comprising:

a first voltage correction means for correcting fluctuation of the voltage to be supplied to the first delay circuit; and a second voltage correction means for correcting fluctuation of the voltage to be supplied to the second delay circuit.

14. The telephone terminal according to claim 10 further comprising: a first control means for shortening the time for turning off supply of the first channel of the drive power to the main unit; and a second control means for shortening the time for turning off supply of the second channel of the drive power to the optional unit.

15. The telephone terminal according to claim 10 further comprising a plurality of the optional units, wherein the second power supplying means supplies the second channel of the drive power to each of the optional units at different supply timings.

16. The telephone terminal according to claim 10, wherein the first power supplying means supplies the first channel of the drive power to a plurality of sections divided in the main unit at different supply timings.

17. The telephone terminal according to claim 10, wherein the second power supplying means supplies the second channel of the drive power to a plurality of sections divided in the optional unit at different supply timings.

* * * * *